Patented July 1, 1952

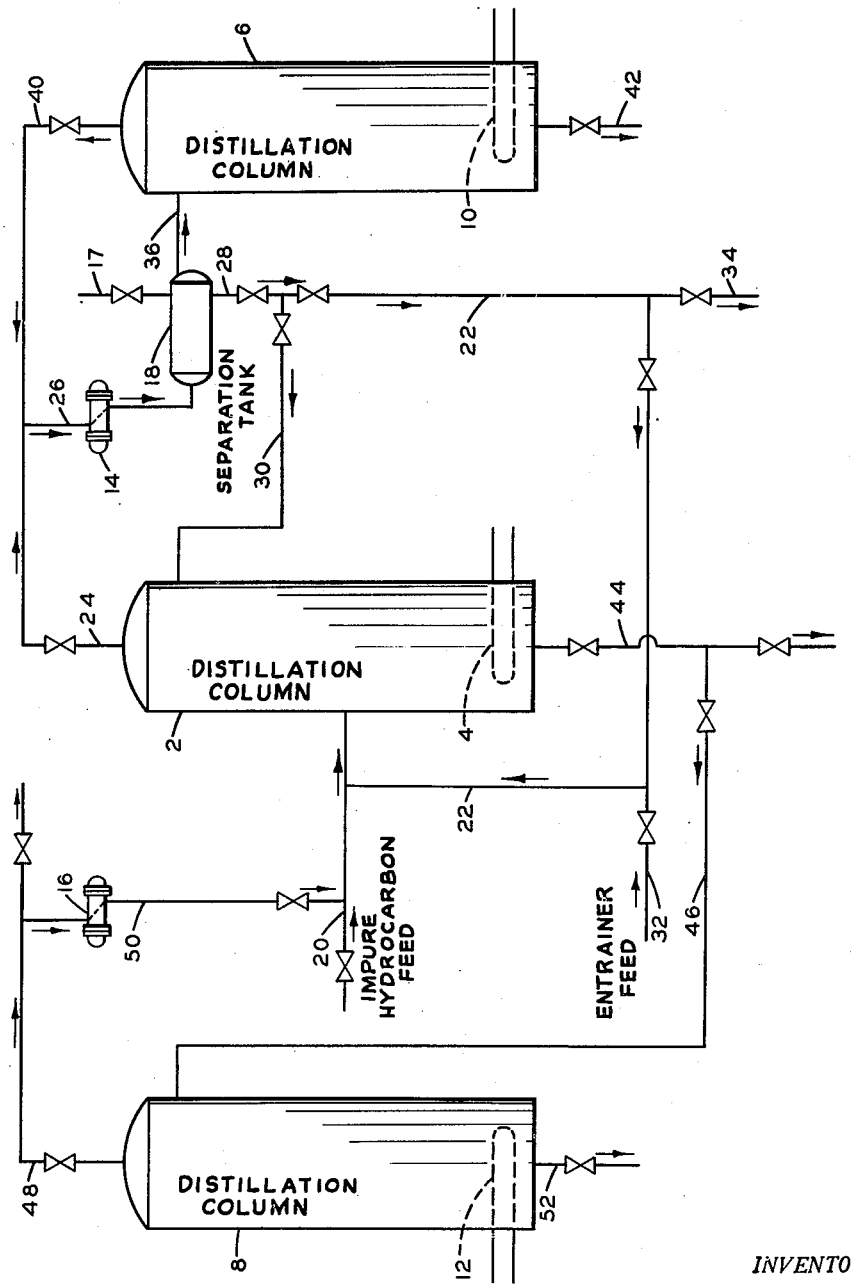

2,602,093

UNITED STATES PATENT OFFICE 2,602,093

SEPARATION OF SULFUR COMPOUNDS FROM HYDROCARBONS

Martin R. Cines, Bartlesville, Okla., assignor to Phillips Petroleum Company, a corporation of Delaware Application December 26, 1950, Serial No. 202,681

8 Claims. (Cl. 260—676)

This invention relates to removal of sulfur compounds from hydrocarbons. In one of its more specific aspects, this invention relates to a method for the separation of aliphatic sulfur compounds from mixtures containing same in admixture with hydrocarbons by azeotropic distillation. In still another of its more specific aspects, this invention relates to a method for the separation of aliphatic sulfur compounds from mixtures containing same in admixture with hydrocarbons by azeotropic distillation using organic perfluoro compounds as entrainers.

The deleterious effects of sulfur compounds in the utilization of hydrocarbons has been disclosed in many places. In gasolines, for example, the lowering of the effectiveness of tetraethyl lead as an antiknock improver is well known. Mercaptans give an offensive odor to hydrocarbon materials in which they are present. In the case of gasolines, the mercaptans are converted to disulfides by sweetening processes in order to overcome objectionable odors. However, the sweetening process does not actually remove the sulfur compounds from the hydrocarbon materials, but merely converts them to substantially odorless compounds. Processes such as bauxite treating at elevated temperature and hydrogenation, for example, over molybdenum sulfide, are used to remove the sulfur rather than merely to convert the sulfur to less objectionable forms.

I have now discovered a new method whereby sulfur compounds, such as aliphatic mercaptans, sulfides and disulfides, can be removed from hydrocarbons and mixtures of hydrocarbons. The process of my invention removes the sulfur compounds by means of azeotropic distillation in the presence of a non-acidic organic perfluoro compound which is employed as the entrainer. In carrying on the azeotropic distillation, the sulfur-containing compounds are removed overhead along with the entrainer and the hydrocarbon material of lowered sulfur content is removed as a kettle product. I find that the usual azeotropic distillation processes and equipment can be used in carrying on the process of my invention.

It is an object of my invention to provide a method for the separation of sulfur compounds from hydrocarbons.

It is another object of my invention to provide a method for the separation of aliphatic sulfur compounds from a hydrocarbon or a mixture of hydrocarbons containing said aliphatic sulfur compounds.

Still another object of my invention is to provide a process for the separation and isolation of one or more aliphatic sulfur compounds, such as mercaptans, sulfides and disulfides, from a mixture containing same in admixture with one or more hydrocarbons, all of the aliphatic sulfur compounds and hydrocarbons falling within a relatively narrow boiling range.

Other objects and advantages of the process of my invention will become apparent, to one skilled in the art, upon reading this disclosure.

The drawing which accompanies and is a part of this disclosure diagrammatically sets forth one arrangement of apparatus which can be conveniently used to carry on the process of my invention.

I have invented a new method of separating sulfur compounds from hydrocarbons. The process of my invention is carried on by azeotropic distillation using organic perfluoro compounds as the entrainer.

I find that the process of my invention is particularly adaptable to the removal of aliphatic sulfur compounds, such as mercaptans, sulfides and disulfides, from a liquid hydrocarbon or from a mixture of liquid hydrocarbons containing said aliphatic sulfur compounds, said mixture having a boiling range not greater than 50° F., more preferably not greater than 25° F. My process is particularly valuable to remove sulfur compounds from hydrocarbon fractions where the sulfur compounds cannot be removed from the hydrocarbons by straight fractional distillation without a great deal of difficulty due to the sulfur compounds having a boiling point close to the boiling point of one or more of the hydrocarbons in the mixture, or because the sulfur compounds form azeotropes with the hydrocarbons.

By the terminology "organic perfluoro compounds" I mean completely fluorinated organic compounds. In carrying on the process of my invention I find it preferable to use non-acidic organic perfluoro compounds. The compounds which I find that I can use as entrainers in the process of my invention can be fluorocarbons, that is, compounds containing only fluorine and carbon, or such other compounds as ethers, amines, and the like, wherein all of the hydrogen atoms directly bonded to carbon in the original organic compounds have been replaced by fluorine atoms. Types of organic perfluoro compounds which I find can be used include perfluoro-paraffins, perfluoro-di-alkyl ethers, perfluoro-tri-alkyl amines, perfluoro-cycloparaffins, perfluoro-alkylcycloparaffins, and other similar types of compounds. Typical compounds which I find can be used as the entrainer in carrying on the process of my invention are perfluoro-methylcyclohexane, and the similar ethyl, propyl, butyl, etc., cyclohexanes; perfluoro-n-heptane, perfluoro-n-hexane, perfluoro-n-pentane, perfluoro-n-butane, etc.; perfluoro-di-n-butyl ether, and the similar ethyl, propyl, amyl, etc., ethers; perfluoro-tri-n-propylamine, and the similar ethyl, butyl, amyl, etc., amines; and the like.

Methods by which the process of my invention can conveniently be carried on are discussed in the following. However, it is to be understood that such discussion is not to unduly limit the scope of my invention. Referring now to the drawing, reference numeral 2 refers to a distillation column or still which, when used in azeotropic distillation, is frequently termed an "azeo" column. This fractionating tower or azeo column can be a conventional bubble cap tower, packed tower or the like. A reboiler coil 4 is positioned in the kettle section for addition of reboiling heat. A separate reboiler can be used, if desired. Column 6 is likewise an azeotropic distillation column, but, as will be subsequently described, this column is usually a smaller column, that is, one having a smaller capacity than the main column 2. A third distillation column 8 is provided for use under special conditions, such as are described hereinafter. Columns 6 and 8 are provided with bubble cap tray assemblies or any desired type of packing suitable for use in the separation steps carried out in these columns. Reboiler coils 10 and 12 are provided in columns 6 and 8, respectively, for furnishing heat for the distillation operations. Separate reboilers can be used, if desired. Units 14 and 16 are overhead condensers for columns 2 and 8, respectively. These condensers can conveniently be water cooled condensers and are normally operated to completely condense the vaporous products passing through the respective vapor inlet lines. Vessel 18 is a separation tank in which two immiscible or nearly immiscible liquid phases are permitted to separate by gravity.

In the operation of this apparatus for carrying out the process of my invention, a narrow boiling range fraction of hydrocarbons and aliphatic sulfur compounds is introduced into fractionator 2 through line 20. The organic perfluoro vapor entrainer compound from a source to be disclosed subsequently, is passed through line 22 into feed line 20 so that a mixture of two liquids, the feed stock and the vapor entrainer, are introduced into fractionator 2 in the middle portion thereof. A sufficiently high temperature is maintained in the kettle section of column 2 by adding heat to reboiler coil 4 to distill overhead an azeotropic mixture of the sulfur compounds and vapor entrainer at a temperature below the boiling temperature of the hydrocarbons. Whether or not the hydrocarbons which boil close to the sulfur compounds or azeotrope with them form an azeotrope with the vapor entrainer is immaterial. If an azeotrope is formed and its vaporization temperature is higher than the vaporization temperature of the sulfur compound azeotrope, the hydrocarbon containing azeotrope will accumulate as still bottoms. In this particular example, if the hydrocarbons form an azeotrope with the vapor entrainer, its volatility is such that it remains as still bottoms and the sulfur compound-organic perfluoro compound azeotrope passes overhead as column overhead product. This vaporous overhead product is passed through lines 24 and 26 into condenser 14 wherein substantially complete condensation of the vapors occurs. The liquid condensate then is passed into separator or accumulator tank 18 in which the sulfur compounds and the liquid vapor entrainer separate as two liquid phases. The organic perfluoro compound normally settles to the bottom since it is usually heavier than the sulfur compounds. In the sulfur compounds layer, there is usually dissolved a small quantity of organic perfluoro compound, while a small quantity of the sulfur compounds usually remain dissolved in the organic perfluoro compound layer.

The organic perfluoro compound layer is removed from separator 18 through line 28. If refluxing liquid is required to control the temperature in the top of the main azeotrope column 2, a portion of the organic perfluoro compound layer passing through line 28 can be passed through line 30 and passed into the azeo column 2 at the proper refluxing point. The remainder of this perfluoro compound layer containing, as mentioned hereinbefore, a small amount of dissolved sulfur compounds is passed from line 28 through line 22 to be added to the original feed stock passed into azeo column 2. This portion of the vapor entrainer is the portion referred to above as originating at a source to be described. Organic perfluoro compound can be added to the system via line 32 or withdrawn from the system via line 34.

The sulfur compounds layer containing some dissolved organic perfluoro compound is removed from accumulator 18 through line 36 and is introduced into the distillation column 6. Heat for distillation is added to this column by the reboiler coil 10. This column is so operated that the small amount of dissolved organic perfluoro compound is vaporized with a corresponding amount of sulfur compounds as azeotrope and is passed through line 40 and line 26 into condenser 14. This azeotrope vapor passing from column 6 through line 40 has substantially the same composition as the azeotropic vapor passing through line 24, when columns 6 and 2 are operated under the same pressure. Since these two vapor streams have the same or substantially the same composition, the vapor streams are combined in line 26 and the combined stream condensed in condenser 14. The condensate is passed into separator 18 for separation of the liquid phases, as discussed hereinbefore. Line 17 is provided with a pressure release valve in case release of pressure from tank 18 is necessary.

Since the amount of organic perfluoro compound contained in the sulfur compound layer in tank 18 is small, the amount of azeotropic vapor passing through line 40 is usually small. Under normal conditions all of the perfluoro compound is distilled overhead in this organic perfluoro compound recovery column 6. By removing all of the organic perfluoro compound overhead, a pure sulfur compound is left in the kettle portion of column 6, and this material is removed from the kettle through line 42 as one of the products of the process. This sulfur compound product stream can be passed to a storage tank or used as desired.

In the operation of the main azeotrope column 2, it is preferred that approximately the exact amount of organic perfluoro entrainer be added with the charge stock to vaporize all of the sulfur compounds contained in the feed stock. If an excess of vapor entrainer is added to column 2, the excess over that required to form the azeotrope with the sulfur compounds will accumulate in the still bottoms and will be removed with the bottoms which are withdrawn through line 44. Distillation column 8 is employed to separate and recover entrainer from the hydrocarbon still bottoms, if necessary or desired.

As mentioned hereinbefore, the preferred method of operation is to add the required amount of vapor entrainer with the feed stock. However, the addition of substantially the exact amount of vapor entrainer is difficult to realize under conditions of normal plant operation. Accordingly, it is preferred then to add a slight excess of vapor entrainer so that all of the sulfur compounds will be taken overhead from the main column 2 and the excess of entrainer over that corresponding to the sulfur compounds will accumulate with the hydrocarbons in the still bottoms, since it is usually desired to remove all of the sulfur compounds from the hydrocarbons. However, in normal commercial operation, cost of operation and capital investment is considerably less when using a slight deficiency of vapor entrainer in place of using an excess, that is, operating to leave a slight amount of sulfur compound in the column 2 bottoms, thus eliminating column 8 operations. The requirements as to the degree of removal of sulfur compounds will usually govern the particular method.

In the case where an excess of vapor entrainer is used in the main azeo column 2, the hydrocarbon bottoms containing this excess of vapor entrainer is passed via lines 44 and 46 and introduced into distillation column 8. Distillation column 8 is operated in such a manner that the vapor entrainer is removed through overhead vapor line 48. This vapor is condensed in condenser 16. The resulting condensate is passed through line 50 and introduced into the main azeotrope column 2 with the feed stock and main quantity of vapor entrainer from line 22. The hydrocarbons accumulate in column 8 as still bottoms and are removed through line 52 and passed to storage or to subsequent use as desired. The particular pressures carried on columns 2, 6 and 8 are not critical, and I prefer to use pressures from atmospheric up to about 50 pounds per square inch gauge. Some pressure greater than atmospheric is ordinarily required to cause flow of products or materials from one stage of the process to the next. One disadvantage of using high pressures in the stills 2, 6 and 8 is that higher reboiler temperatures are required to effect the distillation steps.

The above description is intended to be illustrative for the separation of a narrow boiling fraction according to the process of my invention. The same procedure is used when separating a sulfur compound or compounds from a single hydrocarbon.

Whether operating to separate a sulfur compound or compounds from a hydrocarbon, or one or more sulfur compounds from a fraction containing a plurality of hydrocarbons, it is preferred that the entrainer have a boiling point within at least 50° F. of the boiling point of the sulfur compounds to be taken overhead as azeotrope. This 50° F. temperature difference can be 50° below or 50° above the boiling point of the sulfur compounds.

The following four examples are illustrative of the process of my invention. However, it is to be understood that the temperatures, compositions, materials, etc., are not to be held to unduly limit the scope of my invention.

Examples I, II, and III were carried out in a distillation column consisting of a two foot section of glass tubing, approximately 6 mm. inside diameter, and containing a wire spiral for packing. The column was insulated by a vacuum jacket and equipped with a suitable kettle and total condensing head with a liquid takeoff. Example IV was carried out in a 13 mm. Podbielniak Hypercal distillation column, a very efficient column. The column used to carry out Examples I, II and III had a low efficiency, approximately five theoretical plates. In each case, the separations were carried out at atmospheric pressure.

In carrying out the tests, the kettle of the distillation column was charged with the hydrocarbon and sulfur compound along with the indicated entrainer. The column was then started in operation and when equilibrium was reached, an overhead sample was taken.

The results of the distillations, along with the individual boiling points of the materials charged were as follows:

*Azeotropic distillation data*

| Example | System | B. P. °F. | Charge Vol. Per Cent | Overhead Data | | |
|---|---|---|---|---|---|---|
| | | | | Composition Vol. Per Cent | Temp. °F. | Liquid Phases |
| I | Methyl Ethyl Sulfide | 150.8 | 16.8 | 28.6 | 119 to 123 | Two. |
| | n-Hexane | 155.8 | 55.5 | 12.4 | | |
| | Perfluoro-methylcyclohexane | 163–172 | 27.7 | 59.0 | | |
| II | 1-Butanethiol | 208.4 | 18.8 | 24.8 | 174 | Do. |
| | n-Heptane | 209.1 | 56.2 | 17.2 | | |
| | Perfluoro-di-n-butyl Ether | 213.0 | 25.0 | 58.0 | | |
| III | Methyl Disulfide | 242.6 | 33.3 | 29.5 | 202 | Do. |
| | Toluene | 231.0 | 33.3 | 14.5 | | |
| | Perfluoro-tri-n-propylamine | 265.0 | 33.4 | 56.0 | | |
| IV | Ethyl Disulfide | 308.3 | 7.7 | 11.1 | 286 | Do. |
| | Cumene | 306.5 | 76.9 | 44.7 | | |
| | Perfluoro-tri-n-butylamine | 351.0 | 15.4 | 44.2 | | |

The overhead product resulting from these distillations was homogeneous at the boiling point, but separated into two phases at room temperature. This result of the overhead product separating into two phases at room temperature is indicated in the last column of the above table.

As will be evident to those skilled in the art, the organic perfluoro compounds are very effective as entrainers for the sulfur compounds.

Valves, pumps, pressure and temperature recording and control apparatus, level controllers, and such auxiliary apparatus is not shown in the drawing nor described in this specification, since those skilled in the art understand the necessity for the use of such auxiliary equipment in carrying on processes of the nature of my invention.

As will be evident to those skilled in the art, various modifications of this invention can be made, or followed, in the light of this disclosure and discussion, without departing from the spirit or scope of this disclosure or from th escope of the claims.

I claim:

1. In the treating of hydrocarbon materials the improvement comprising, subjecting a mixture of hydrocarbons and organic sulfur compounds in the presence of a non-acidic, aliphatic perfluoro compound capable of forming a distillable azeotrope with said sulfur compounds to distillation, recovering resulting distillate containing sulfur compounds, and recovering resulting bottoms containing hydrocarbons.

2. In the treating of hydrocarbon materials the improvement comprising, subjecting a mixture of hydrocarbons and aliphatic sulfur compounds, in liquid state, in the presence of a non-acidic, aliphatic perfluoro compound having a normal boiling point within 50° F. of the normal boiling point of said sulfur compounds to distillation, removing resulting distillate containing sulfur compounds, and removing resulting bottoms containing hydrocarbons.

3. In the treating of hydrocarbon materials the improvement comprising, subjecting a narrow boiling range liquid fraction of hydrocarbons containing aliphatic sulfur compounds in the presence of a completely fluorinated, non-acidic, aliphatic organic compound having a normal boiling point within 50° F. of the normal boiling point of said sulfur compounds to distillation, withdrawing resulting distillate comprising said sulfur compounds and fluorinated organic compound, and withdrawing resulting bottoms comprising said hydrocarbons.

4. In the refining of hydrocarbons the improvement comprising, subjecting a narrow boiling range liquid fraction of hydrocarbons containing aliphatic sulfur compounds in the presence of a completely fluorinated organic compound selected from the group of compounds consisting of perfluoro-paraffins, perfluoro-di-alkyl ethers, perfluoro-tri-alkyl amines, perfluoro-cycloparaffins and perfluoro-alkyl-cycloparaffins to distillation, said fluorinated organic compound boiling within 50° F. of said aliphatic sulfur compounds, withdrawing resulting distillate comprising said sulfur compounds and said fluorinated organic compound, and withdrawing resulting bottoms comprising said hydrocarbons.

5. The method for separating normal hexane from admixture with methyl ethyl sulfide comprising, subjecting said admixture to distillations in the presence of perfluoro-methylcyclohexane, withdrawing resulting distillate comprising said methyl ethyl sulfide and said perfluoro-methylcyclohexane, and withdrawing resulting bottoms comprising said normal hexane.

6. The method for separating normal heptane from admixture with 1-butanethiol comprising, distilling said admixture in the presence of perfluoro-di-n-butyl ether, recovering said 1-butanethiol from resulting distillate as one product of the process and recovering said normal heptane from resulting still bottoms.

7. In the refining of hydrocarbons the improvement comprising, subjecting a narrow boiling range liquid fraction of hydrocarbons containing aliphatic sulfur compounds to distillation in the presence of a completely fluorinated organic compound selected from the group of compounds consisting of perfluoro-paraffins, perfluoro-di-alkyl-ethers, perfluoro-tri-alkyl amines, perfluoro-cycloparaffins and perfluoro-alkyl-cycloparaffins, as a vapor entrainer, condensing resulting overhead vapors, separating resulting condensate into an aliphatic sulfur compound phase containing completely fluorinated organic compound in solution and a completely fluorinated organic compound phase containing aliphatic sulfur compounds in solution, recycling this latter fluorinated organic compound phase containing aliphatic sulfur compounds into the original distillation operation as said completely fluorinated organic compound, subjecting said separated aliphatic sulfur compound phase containing completely fluorinated organic compound in solution to distillation, condensing resulting overhead vapors from this latter distillation operation and adding resulting condensate to said condensate of said first mentioned distillation operation, removing resulting bottoms from this second distillation operation as one product of the process and removing resulting bottoms from said first mentioned distillation operation as a second product of the process.

8. In the method of claim 7, dividing said completely fluorinated organic compound phase containing aliphatic sulfur compounds in solution into two portions, using one portion as reflux in said first distillation operation and recycling a second portion into said original distillation operation as said vapor entrainer.

MARTIN R. CINES.

No references cited.